United States Patent
Lang (10) Patent No.: US 10,411,791 B2
(45) Date of Patent: Sep. 10, 2019

(54) DUAL-FREQUENCY DOWNLINK TRANSMITTER

(71) Applicant: Airbus Defence and Space GmbH, Taufkirchen (DE)

(72) Inventor: Rainer Lang, Immenstaad (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/954,850

(22) Filed: Apr. 17, 2018

(65) Prior Publication Data
US 2018/0316415 A1   Nov. 1, 2018

(30) Foreign Application Priority Data
Apr. 28, 2017   (GB) .................. 17168651.2

(51) Int. Cl.
| H04B 7/185 | (2006.01) |
|---|---|
| H04B 1/00 | (2006.01) |
| H04L 25/02 | (2006.01) |
| H04B 1/04 | (2006.01) |
| H04B 7/10 | (2017.01) |

(52) U.S. Cl.
CPC ....... H04B 7/18513 (2013.01); H04B 1/0064 (2013.01); H04B 1/0458 (2013.01); H04B 7/10 (2013.01); H04B 7/18515 (2013.01); H04L 25/0278 (2013.01)

(58) Field of Classification Search
CPC .............. H04B 7/18513; H04B 1/0064; H04B 1/0458; H04B 7/10; H04B 7/18515; H04L 25/0278

USPC ....................................................... 455/12.1
See application file for complete search history.

(56) References Cited

U.S. PATENT DOCUMENTS

| 7,366,463 B1* | 4/2008 | Archer ............... H04B 7/18563 |
| | | 342/352 |
| 7,751,779 B2* | 7/2010 | Ho ..................... H04B 7/18515 |
| | | 342/352 |

(Continued)

FOREIGN PATENT DOCUMENTS

WO   2016094786   6/2016

OTHER PUBLICATIONS

European Search Report, dated Oct. 31, 2017, priority document.

*Primary Examiner* — Sonny Trinh
(74) *Attorney, Agent, or Firm* — Greer, Burns & Crain, Ltd.

(57) ABSTRACT

A transmitter for a dual-frequency satellite-to-earth downlink. The transmitter comprises a plurality of modulators, a first and a second plurality of amplifiers. In one embodiment, each of the modulators is configured to modulate respective input data onto a respective one of a first plurality of signals in a first frequency band and to modulate the respective one of the first plurality of signals onto a respective one of a second plurality of signals in a second frequency band. Each of the first plurality of amplifiers is configured to amplify one of the first plurality of signals to a first predetermined signal strength. Each of the second plurality of amplifiers is configured to amplify one of the second plurality of signals to a second predetermined signal strength. A number of the plurality of modulators is smaller than a sum of a number of the first and second pluralities of amplifiers.

12 Claims, 5 Drawing Sheets

(56) References Cited

U.S. PATENT DOCUMENTS

| | | | |
|---|---|---|---|
| 8,140,005 B2* | 3/2012 | Runyon | H01Q 1/42 |
| | | | 375/219 |
| 9,154,217 B1* | 10/2015 | Jain | H04B 7/18528 |
| 10,263,648 B2* | 4/2019 | Eng | H04B 1/0071 |
| 2007/0155319 A1 | 7/2007 | Monte et al. | |
| 2017/0041065 A1* | 2/2017 | Goettle, Jr. | H03F 1/0261 |

* cited by examiner

DUAL-FREQUENCY DOWNLINK TRANSMITTER

CROSS-REFERENCES TO RELATED APPLICATIONS

This application claims the benefit of the European patent application No. 17168651.2 filed on Apr. 28, 2017, the entire disclosures of which are incorporated herein by way of reference.

BACKGROUND OF THE INVENTION

The present disclosure is directed to a transmitter for a dual-frequency satellite-to-earth downlink.

In downlink systems from a satellite to earth, X-Band and Ka-Band frequencies are used to be transmitted via two separated transmission paths separated from each other underlying the disadvantage of having a lot of hardware to be fed with power and occupying space on a respective transmitter board. The respective transmitter board itself should be very small with respect to the satellite's payload parameters, such that hardware minimization in terms of size is a driving goal in satellite construction. However, current implementations of transmitters in satellites still provide for each separate channel separate input data and separate modules, such that each transmission channel works independent of each other, which increases the amount of hardware used in the transmitter implementation.

SUMMARY OF THE INVENTION

Thus, it is an object of the present invention to reduce the amount of hardware in a transmitter.

According to a first aspect, a transmitter for a dual-frequency satellite-to-earth downlink is provided. The transmitter comprises a plurality of modulators, a first plurality of amplifiers and a second plurality of amplifiers. Each of the plurality of modulators is configured to modulate respective input data onto a respective one of a first plurality of signals in a first frequency band and to modulate the respective one of the first plurality of signals onto a respective one of a second plurality of signals in a second frequency band, or each of the plurality of modulators is configured to modulate respective input data onto a respective one of a first plurality of signals in a first frequency band and to modulate the respective input data onto a respective one of a second plurality of signals in a second frequency band.

Each of the first plurality of amplifiers is configured to amplify a respective one of the first plurality of signals to at least a first predetermined signal strength. Each of the second plurality of amplifiers is configured to amplify a respective one of the second plurality of signals to at least a second predetermined signal strength. A number of the plurality of modulators is smaller than a sum of a number of the first plurality of amplifiers and the second plurality of amplifiers.

This has the advantage of minimizing input data and minimizing the amount of memory used for providing the input data.

The respective input data can be the same or different for each of the plurality of modulators. This can further minimize an amount of memory to be used for providing the input data to the transmitter.

The first frequency band can be an X-Band and the second frequency band can be a Ka-Band.

Each of the plurality of modulators can be configured to modulate the respective one of the first plurality of signals onto the respective one of the second plurality of signals by mixing the respective one of the first plurality of signals with a carrier signal having a frequency of a mid-frequency of the second frequency band minus a mid-frequency of a respective one of a plurality of channels in the first frequency band. The respective one of the first plurality of signals can be transmitted on the respective one of the plurality of channels.

The first and second predetermined signal strengths can each be at least sufficient for the dual-frequency satellite-to-earth downlink such that a receiver on earth can be enabled to demodulate and extract the respective input data.

The first predetermined signal strength can be smaller than the second predetermined signal strength. In Ka-Band more power is to be provided than in the X-Band.

The first and second frequency bands can be used for the dual-frequency satellite-to-earth downlink.

A respective one of a first plurality of transmission channels can at least comprise a respective one of the first plurality of amplifiers. A respective one of a second plurality of transmission channels can at least comprise a respective one of the second plurality of amplifiers. The transmitter can further comprise a control unit. The control unit can be configured to selectively activate or deactivate the respective one of the first plurality of transmission channels. The control unit can further be configured to selectively activate or deactivate the respective one of the second plurality of transmission channels.

Thus, by switching on and off respective transmission channels in the transmitter, the deactivated amplifiers save power, because they are not used.

The control unit can be configured to activate the respective one of the first plurality of transmission channels, when the respective one of the first plurality of transmission channels is to be used for the dual-frequency satellite-to-earth downlink. The control unit can further be configured to deactivate the respective one of the first plurality of transmission channels, when the respective one of the first plurality of transmission channels is not to be used for the dual-frequency satellite-to-earth downlink. The control unit can be configured to activate the respective one of the second plurality of transmission channels, when the respective one of the second plurality of transmission channels is to be used for the dual-frequency satellite-to-earth downlink. The control unit can further be configured to deactivate the respective one of the second plurality of transmission channels, when the respective one of the second plurality of transmission channels is not to be used for the dual-frequency satellite-to-earth downlink.

The transmitter can further comprise a first switching and filtering unit and a second switching and filtering unit. The first switching and filtering unit can be configured to provide, in the case of exactly one activated transmission channel of the first plurality of transmission channels, the respective one of the first plurality of signals to a first antenna, and configured to combine, in the case of exactly two activated transmission channels of the first plurality of transmission channels, the respective two of the first plurality of signals to two orthogonally polarized signals and configured to provide the two orthogonally polarized signals to the first antenna. The second switching and filtering unit can be configured to provide, in the case of exactly one activated transmission channel of the second plurality of transmission channels, the respective one of the second plurality of signals to a second antenna, and configured to combine, in the case of exactly two activated transmission channels of the second plurality of transmission channels, the respective two of the second plurality of signals to a combined signal separated by frequency and configured to provide the combined signal to the second antenna.

This has the advantage to maximize an output in a respective frequency band. Thus, power can be reduced by minimizing a bandwidth or using orthogonality of transmitted electromagnetic waves.

The first and second antennas can be the same. The first antenna can be the second antenna.

The transmitter can further comprise the first antenna and the second antenna. The first antenna can be configured to be impedance matched with the first frequency band and configured to transmit orthogonally polarized electromagnetic waves. The second antenna can be configured to be impedance matched with the second frequency band and configured to transmit electromagnetic waves in one polarization direction.

The control unit can further be configured to selectively activate or deactivate the respective one of the first plurality of transmission channels by providing a first control signal to switch off the respective one of the first plurality of amplifiers included in the respective one of the first plurality of transmission channels. The control unit can further be configured to selectively activate or deactivate the respective one of the second plurality of transmission channels by providing a second control signal to switch off the respective one of the second plurality of amplifiers included in the respective one of the second plurality of transmission channels.

Hereby, deterioration can be minimized by switching between different amplifiers. Thus, life expectancy of Ka-Band and X-Band amplifiers is increased.

It is clear to a person skilled in the art that the statements set forth herein under use of hardware circuits, software means or a combination thereof may be implemented. The software means can be related to programmed microprocessors or a general computer, an ASIC (Application Specific Integrated Circuit) and/or DSPs (Digital Signal Processors). For example, a memory, signal processing unit, the transmitter and the control unit may be implemented partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP. It is further clear to the person skilled in the art that even if the herein-described details will be described in terms of a method, these details may also be implemented or realized in a suitable device, a computer processor or a memory connected to a processor, wherein the memory can be provided with one or more programs that perform the method, when executed by the processor. Therefore, methods like swapping and paging can be deployed.

Even if some of the aspects described above and below have been described in reference to a modulator or modulators, these aspects may also apply to the transmitter. Likewise, the aspects described above and below in relation to the transmitter may be applicable in a corresponding manner to the modulator(s).

BRIEF DESCRIPTION OF THE DRAWINGS

Other objects, features, advantages and applications will become apparent from the following description of non-limiting embodiments regarding the accompanying drawings. In the drawings, all described and/or illustrated features, alone or in any combination form the subject matter disclosed therein, irrespective of their grouping in the claims or their relations/references. The dimensions and proportions of components or parts shown in the figures are not necessarily to scale; these dimensions and proportions may differ from illustrations in the figures and implemented embodiments.

DETAILED DESCRIPTION OF THE PREFERRED EMBODIMENTS

The variants of the functional and operational aspects, as well as their functional and operational aspects described herein, are only for a better understanding of its structure, its functions and properties; they do not limit the disclosure to the embodiments. The figures are partially schematic, the essential properties and effects are clearly shown enlarged or scaled down in part to clarify the functions, active principles, embodiments and technical characteristics. Every operation, every principle, every technical aspect and every feature that/which is disclosed in the figures or in the text is/can be combined with all claims, each feature in the text and the other figures, other modes of operation, principles, technical refinements and features that are included in this disclosure, or result from it, so that all possible combinations are assigned to the devices and methods described. They also include combinations of all individual comments in the text, that is, in each section of the description, in the claims and combinations between different variations in the text, in the claims and in the figures, and can be made to subject-matter of further claims. The claims do not limit the disclosure and therefore the possible combinations of all identified characteristics among themselves. All features disclosed are explicitly also individually and in combination with all other features disclosed herein.

In the figures herein, corresponding or functionally similar components are provided with the same or similar reference numerals. The transmitter and modulator will now be described with respect to the embodiments.

In the following, without being restricted thereto, specific details are set forth to provide a thorough understanding of the present disclosure. However, it is clear to the skilled person that the present disclosure may be used in other embodiments, which may differ from the details set out below.

Figure 1:
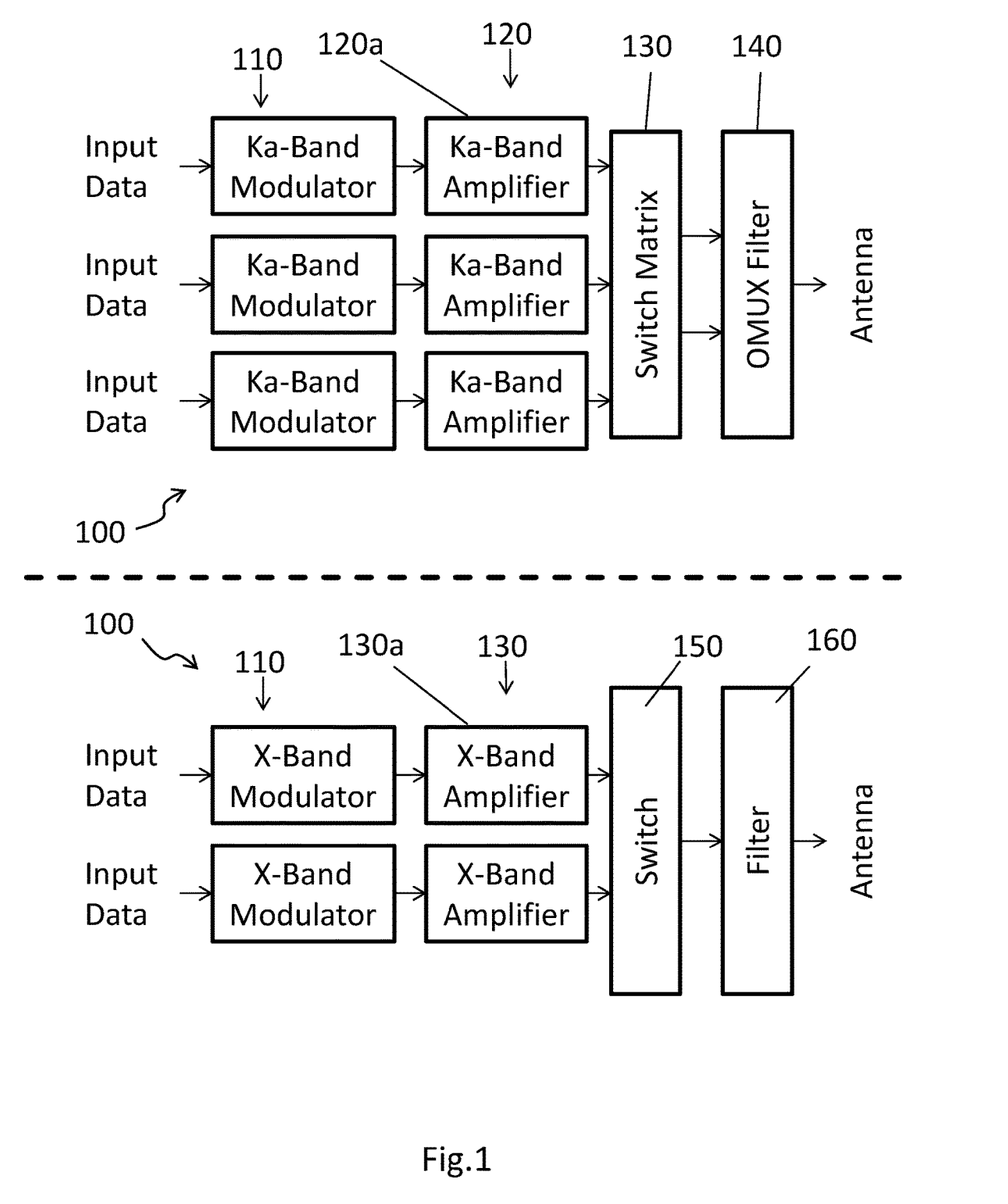
FIG. 1 shows a schematic illustration of a transmitter.

A downlink system is shown in FIG. 1. The transmitter 100 comprises, on the one hand, a Ka-Band side and on the other hand an X-Band side. Each of the two sides comprises modulators 110, amplifiers 120, switch matrix/switch 130 and 150 and OMUX (output multiplexer) filter/filter 140 and 160. Both terms "switch matrix" and "switch" can be used interchangeably within this disclosure, as well as the terms "OMUX filter" and "filter." On the Ka-Band side, respective input data is input to the Ka-Band modulators 110, which modulate the respective input data directly to the Ka-Band. The respective modulated input data is then fed to the respective one of the Ka-Band amplifiers 120. The Ka-Band amplifiers amplify the Ka-Band signal from the Ka-Band modulators 110 to a power, which is sufficient for a downlink from a satellite to earth. After amplification of each of the Ka-Band signals by the amplifiers 120, all the amplifier output signals are input to a switch matrix 130, which is adapted to switch the activated Ka-Band transmission channels to the OMUX filter 140. The Ka-Band transmission channels in FIG. 1 comprise the Ka-Band modulators and Ka-Band amplifiers respectively. Thus, in FIG. 1 there are three different Ka-Band transmission channels. Not all three Ka-Band transmission channels are simultaneously input to the OMUX filter 140, but only activated Ka-Band transmission channels, such that only two of the three Ka-Band transmission channels are to be transmitted, and that the switch matrix 130 is configured to direct or provide two switch matrix output signals corresponding to the two activated Ka-Band transmission channels to the OMUX filter 140. The OMUX filter 140 is then adapted to combine the two switch matrix output signals to exactly one antenna, such that the two switch matrix output signals are separated by frequency within exactly one signal to be transmitted over the antenna.

The other part of the transmitter 100 in the X-Band comprises X-Band modulators 110, X-Band amplifiers 130, a switch 150 and a filter 160. Input data is input to the respective X-Band modulator 110, which is configured to modulate the input data onto a signal within the X-Band. Each of the X-Band modulators 110 then feeds a respective one of the X-Band amplifiers 130. In a respective way, other input data is modulated onto another signal in X-Band and then amplified by another respective one of the X-Band amplifiers 130, as shown by the two respective X-Band transmission channels, each comprising one of the X-Band modulators 110 and the respective X-Band amplifier 130 (connection illustrated by an arrow from the respective one of the X-Band modulators 110 to the respective one of the X-Band amplifiers 130). After amplification to a signal level sufficient for an earth receiver, each of the two amplified X-Band signals is input to the switch 150, such that two input signals are output to a filter 160, which filters undesired frequency parts. After filtering by the filter 160, the signal is fed to an antenna.

Figure 2:
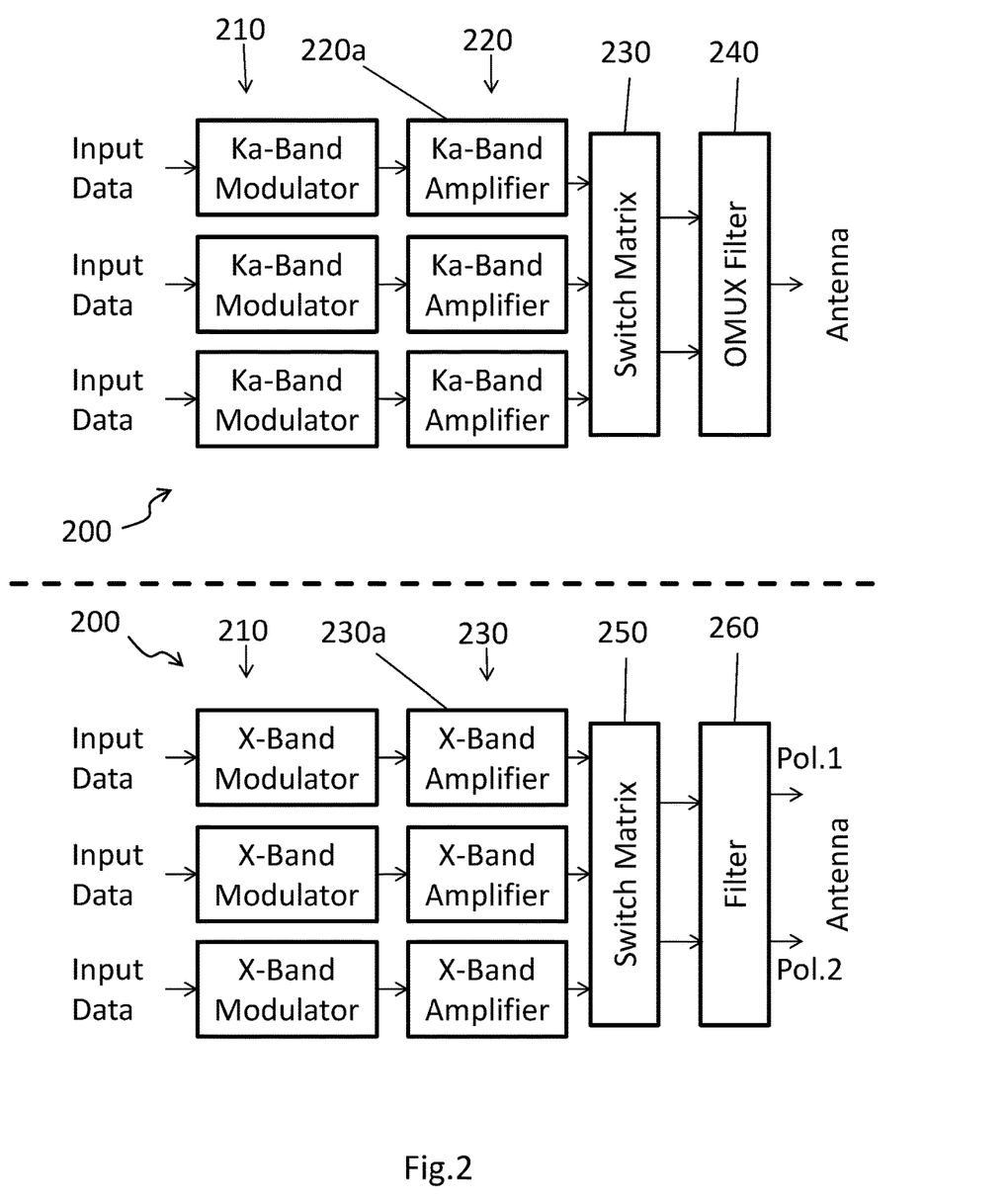
FIG. 2 shows another schematic illustration of a transmitter.

In FIG. 2, the same concept applies as for FIG. 1. The transmitter 200 comprises, on the one hand, a Ka-Band side and, on the other hand, an X-Band side. The transmitter 200 comprises Ka-Band modulators 210, Ka-Band amplifiers 220, a switch matrix 230 and an OMUX filter 240. The transmitter 200 works by receiving input data respectively on inputs of the Ka-Band modulators 210. The Ka-Band modulators 210 respectively modulate the respective input data to a Ka-Band signal and then feed the respective Ka-Band signal to a Ka-Band amplifier 220. The respective Ka-Band amplifiers 220 then feed their respective amplified signals with a signal level sufficient for an earth receiver to a switch matrix 230. The switch matrix 230 switches the amplified signals to an OMUX filter 240. The switch matrix 230 receives, in FIG. 2, three amplified signals and feeds two output signals to the OMUX filter 240. The two output signals correspond to the number of activated transmission channels which are to be transmitted via the antenna. The OMUX filter 240, on the one hand, filters undesired frequency parts, such that only the desired frequency parts are to be transmitted via the antenna. Further, the OMUX filter 240 can combine two signals separated by frequency to one signal having two separate frequency bands/channels within the Ka-Band.

The transmitter 200 further comprises on the X-Band side, three X-Band modulators 210, three X-Band amplifiers 230, one switch matrix 250 and one filter 260. Each X-Band modulator 210 receives respective input data and modulates the input data in the frequency domain to an X-Band. The X-Band signal of the respective X-Band modulator output is then fed to an X-Band amplifier 230 respectively for every X-Band modulator output. The X-Band amplifier 230 then amplifies the respective X-Band signal to a signal level, such that it can be received by a receiver on earth. The amplified signal from the X-Band amplifier 230 is then fed to a switch matrix 250. The switch matrix 250 has three feed lines connected to the respective X-Band amplifiers and is able to switch two amplified signals of two activated transmission channels of the three different possible transmission channels to the filter 260. The filter 260 filters undesired frequency parts and outputs two different signals to the common antenna which provides orthogonal polarization directions Pol.1 and Pol.2 which are transmitted in the same X-band.

FIG. 1 and FIG. 2 provide a transmitter concept for a downlink system provided on a satellite for a satellite-to-earth downlink system. The main disadvantage of this concept lies within the two separated transmitter elements for Ka-Band, on the one hand, and X-Band, on the other hand, as illustrated by a dashed line in FIG. 1 and FIG. 2, separately. The present invention therefore provides a decreased number of hardware elements within a transmitter and further develops the concept of the transmitter as shown in FIG. 1 and FIG. 2 by combining hardware elements and making room for other important payload parameters on a satellite. Thus, further costs for an overall satellite system can be decreased.

Figure 3:
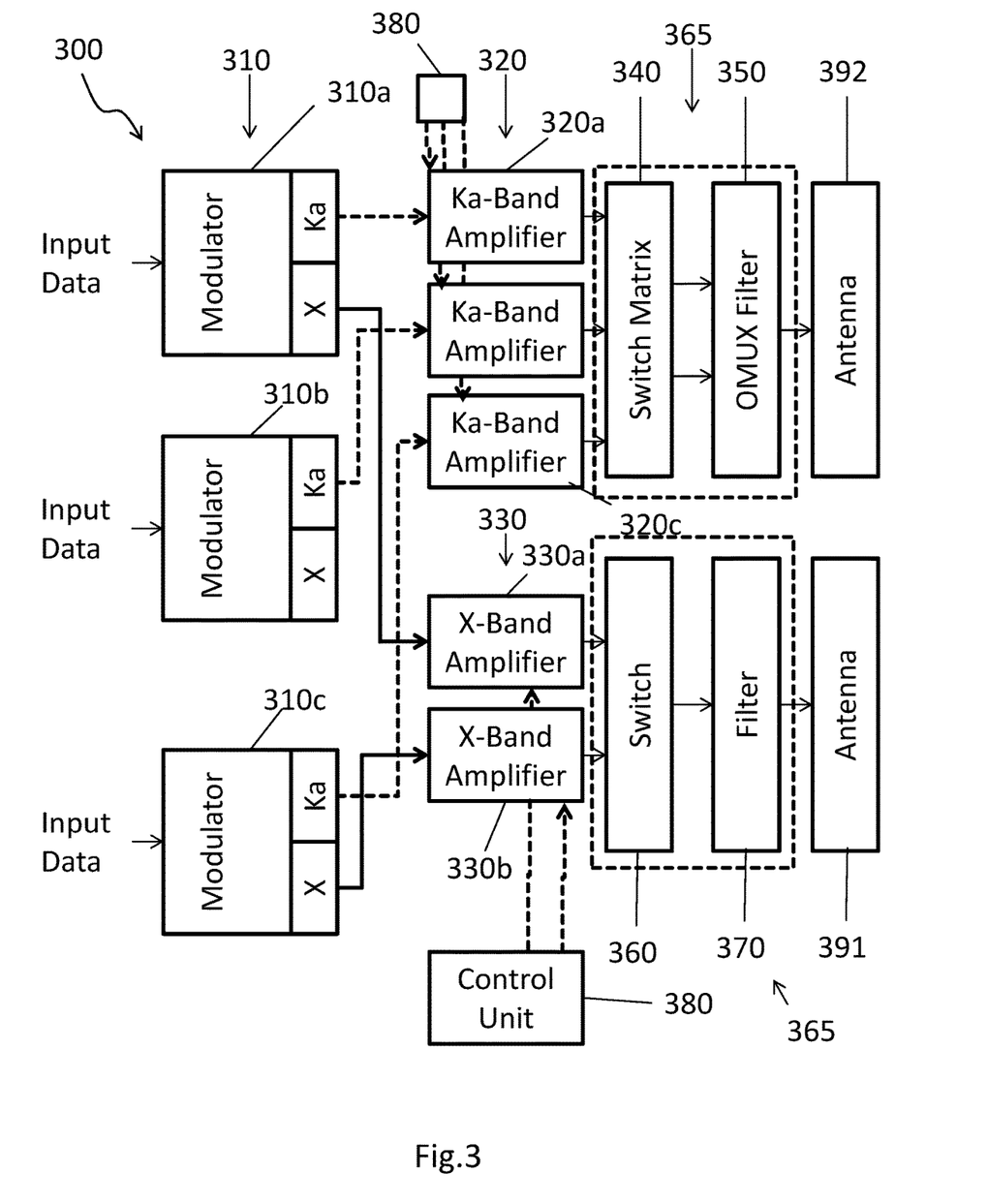
FIG. 3 shows a schematic illustration of a transmitter with a smaller number of modulators.

FIG. 3 shows a schematic illustration of a transmitter 300. The transmitter 300 comprises three modulators 310, three Ka-Band amplifiers 320, two X-Band amplifiers 330, one switch matrix 340, one OMUX filter 350, one switch 360, one filter 370 and two antennas 391 and 392. The connections (illustrated as solid and dashed line arrows in FIG. 3) between the respective units (310, 320, 365, 391, 392) of the transmitter 400 are established via high frequency components, such as waveguides, hollow waveguides or coaxial cables. The transmitter 300 further comprises a control unit 380. The transmitter 300 can further comprise another control unit 380, however is not restricted to a number of control units 380, such that one or each of the control units 380 is able to control each of the X-Band amplifiers and each of the Ka-Band amplifiers. The switch matrix 340 can also be understood as switch. The OMUX filter 350 can also be understood as filter. The switch matrix 340 and OMUX filter 350 as well as the switch 360 and the filter 370 can be understood as a switching and filtering unit 365, respectively, such that the switching and filtering unit 365 can respectively comprise a switch 340/360 and a filter 350/370 operative with each other. Each of the three modulators is able to receive different and same input data.

The input data is then modulated onto a signal in the X-Band by the X-Band modulator 310. Before modulation of the input data, the input data is received from a data source like an instrument, a storage or mass memory (not illustrated). Further, the modulators 310 can take over the step of coding and partly the step of formatting. The X-Band modulated input data is then fed from the respective one of the modulators 310 to the respective one of the X-Band amplifiers 330. This applies to all three X-Band modulators 310, respectively. Further, the X-Band modulated signal of any one of the modulators 310a, 310b and 310c is modulated/upconverted to the Ka-Band. Thus, there is a non-direct implementation of an upconversion from the input data to the Ka-Band. Each of the upconverted Ka-Band signals comprises the respective input data and is then fed from the respective modulators 310a, 310b and 310c to the respective Ka-Band amplifiers 320a, 320b (not illustrated in FIGS. 3) and 320c. Each of the Ka-Band amplifiers 320 is adapted to amplify the respective Ka-Band signal received from the respective one of the modulators 310. Further, the X-Band amplifiers 330a and 330b are adapted to also amplify the respective X-Band signal received from the respective modulators 310. Further, transmission channels to be activated and to be transmitted via the antennas 391 and 392 are selected by the one or more control units 380. The one or more control units 380 are adapted to selectively activate the Ka-Band amplifiers 320 and X-Band amplifiers 330 depending on the number of transmission channels per Ka-Band or X-Band to be transmitted, respectively.

In FIG. 3, three Ka-Band transmission channels are provided comprising the Ka-Band amplifiers 320. Further, in FIG. 3, two of the three Ka-Band transmission channels are switched by the switch matrix 340 to the OMUX filter 350. The OMUX filter 350 is then able to multiplex the so received two Ka-Band signals of the two activated transmission channels. The OMUX filter 350 is able to combine the two Ka-Band signals to exactly one signal being separated by frequency and transmitted via the antenna 392 with a same polarization, for example a circular polarization. Further, in FIG. 3, two X-Band transmission channels are provided, such that each of the two X-Band transmission channels can be switched on and off by the control unit 380 via activating or deactivating the respective X-Band amplifiers 330. The switch 360 can then provide the filter 370 with the respective signal of the activated X-Band transmission channel The filter 370 then filters out undesired frequency parts, for example higher or lower than the X-Band. Afterwards, the filtered X-Band signal is fed to the antenna 391.

Figure 4:
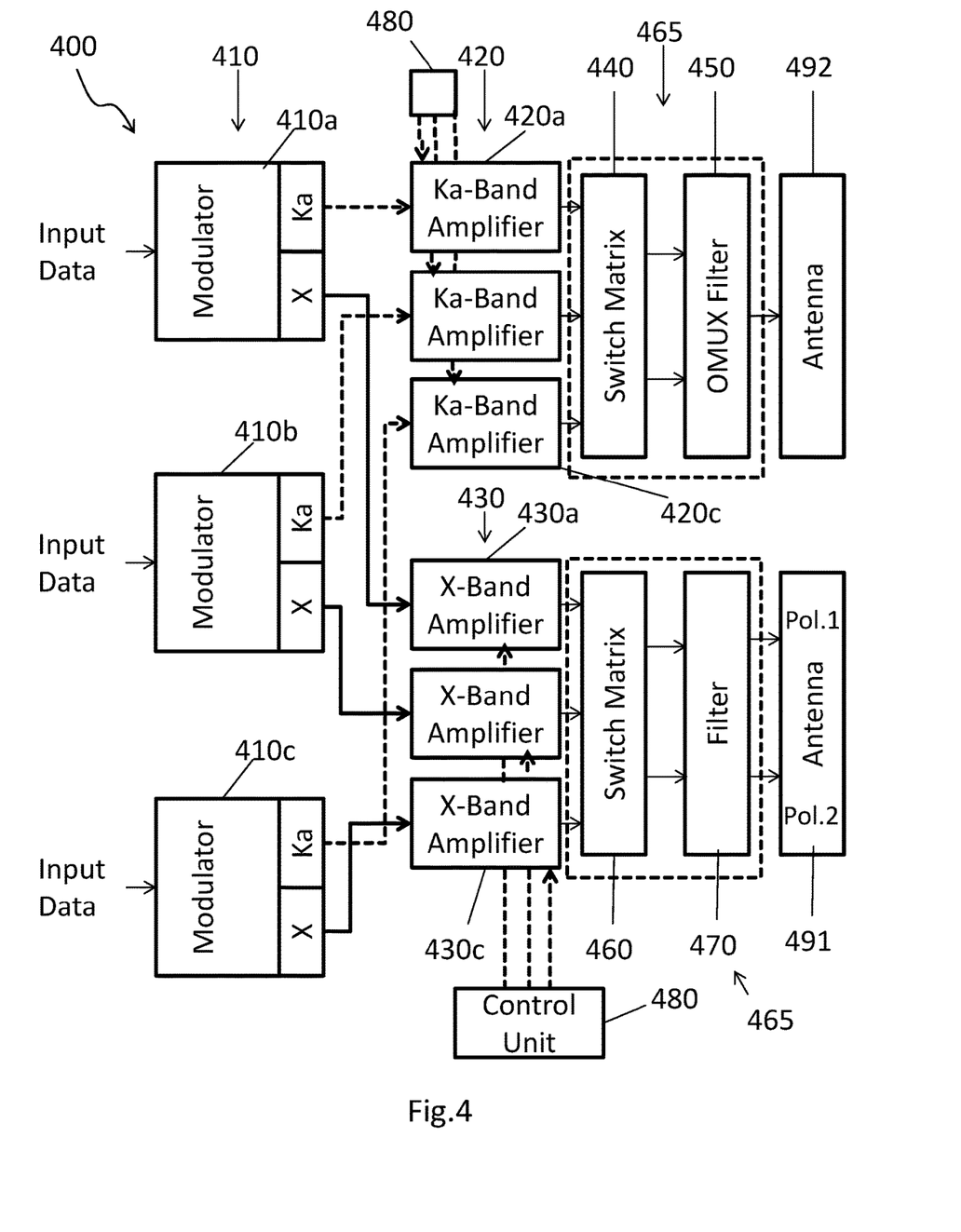
FIG. 4 shows another schematic illustration of a transmitter with a smaller number of modulators.

Further, a schematic illustration of a transmitter 400 is shown in FIG. 4. The transmitter 400 comprises three modulators 410 with each modulator 410a, 410b and 410c having two outputs for X-Band and Ka-Band. The transmitter 400 further comprises three Ka-Band amplifiers 420 and three X-Band amplifiers 430. The transmitter 400 further comprises one or more control units 480, an X-Band switch matrix 460, a Ka-Band switch matrix 440, a filter for X-Band 470, a Ka-band OMUX filter 450, and antenna 391 for X-Band and an antenna 392 for Ka-Band. The switch matrices 440 and 460 can also be understood as switches. The OMUX filter 450 can also be understood as filter. The switch matrix 440 and OMUX filter 450 as well as the switch 460 and the filter 470 can be understood as a switching and filtering unit 465, as in FIG. 3, such that switching and filtering unit 465 can respectively comprise the switch 440/460 and the filter 450/470 operative with each other. The connections (illustrated as solid and dashed line arrows in FIG. 4) between the respective units (410, 420, 465, 491, 492) of the transmitter 400 are established via high frequency components, such as waveguides, hollow waveguides or coaxial cables. Input data is fed to a respective one 410a of the modulators 410. The modulator 410a then modulates the input data onto an X-Band signal. Before the input data is received from a storage device or mass memory (not illustrated), the input data is first formatted and encoded. The X-Band modulated signal is then fed to the X-Band amplifier 430a, as well as upconverted to the Ka-Band and then fed to the Ka-Band amplifier 420a. The same applies to the respective other modulators 410 and amplifiers 420. Together with the other signals amplified by the respective X-Band amplifiers 420, all the X-Band amplified signals are then fed to the switch matrix 460 (in X-Band), when the respective X-Band transmission channel is activated. The switch matrix 460 (in X-Band) switches the signals corresponding to the activated X-Band transmission channel to the filter 470. The filter 470 filters out undesired frequency parts outside the X-Band. For example, the activated X-Band transmission channels comprise the X-Band amplifiers 430a and 430c, such that both provide the switch matrix with a respective X-Band amplified signal which is then respectively fed to the filter 470, which filters out undesired frequency parts. The two filtered signals have two orthogonal polarizations to be transmitted via the antenna 491, such that a data rate can be doubled, even if the two X-Band signals to be transmitted have the same channel within the frequency band. The two polarizations can be provided for example by an ortho-mode transducer in the antenna. Further, the upconverted Ka-Band signal input to the Ka-Band amplifier 420a is amplified and fed to the switch matrix 440. The switch matrix 440 switches two signals of two activated Ka-Band transmission channels of three available Ka-Band transmission channels in FIG. 4 to the OMUX filter 450. The OMUX filter 450 is able to provide the antenna 392 with one combined signal by multiplexing and filtering undesired frequency parts aside the Ka-Band. Thus, the antenna 392 is fed by the OMUX filter 450 with a signal having two frequency channels in the Ka-Band corresponding to the two frequency divided signals multiplexed by the OMUX filter 450. Thus, the antenna 392 is able to be of a circular polarization and is able to transmit two frequency bands having different mid-frequencies in the Ka-Band.

In FIGS. 3 and 4, the amplifiers for X-Band and Ka-Band can be travelling-wave tube amplifiers, TWTA, or solid-state power amplifiers, SSPA. Since TWTA deliver higher output power needed for higher frequencies (see free space loss), TWTA is preferred for Ka-Band and TWTA or SSPA is preferred for X-Band to reduce power consumption. In the case of two transmission channels in either of Ka-Band and X-Band, one of the modulators (illustrated in FIGS. 3 and 4) can be omitted. An advantageous effect of the present invention is the reduction of the number of necessary interfaces between input data sources and Ka-Band and X-Band transmission channels.

Figure 5:
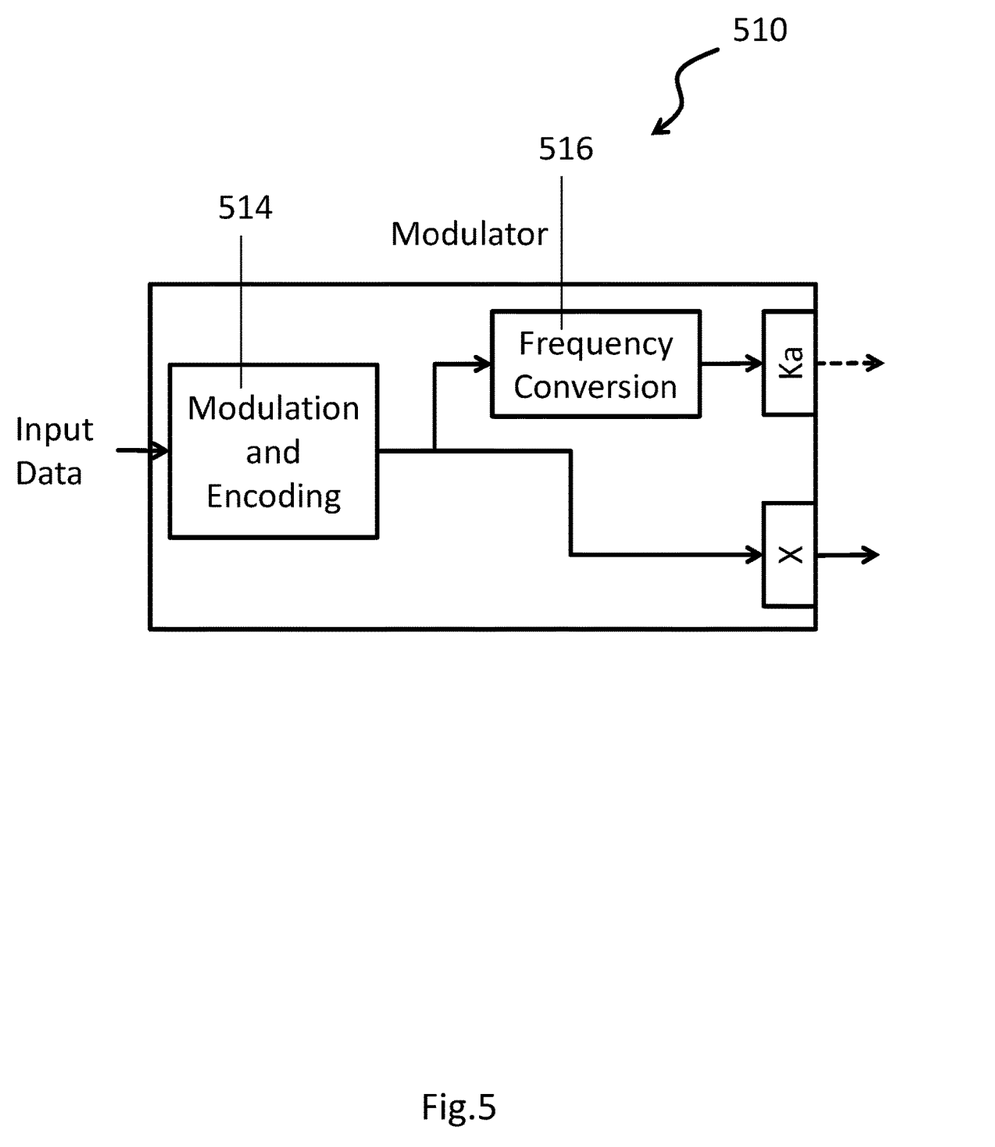
FIG. 5 shows a schematic illustration of a modulator.

FIG. 5 schematically illustrates a modulator 510 as described above in FIG. 3 and FIG. 4 being able to output X-Band and Ka-Band signals. The modulator 510 comprises a modulation and encoding unit 514 and a frequency conversion unit 516. The modulator 510 receives input data, formats, encodes and modulates, via the modulation and encoding unit 514, the input data onto a first frequency band, hereinabove described as X-Band. After modulation and coding, the input data is then provided to the frequency conversion unit 516. The frequency conversion unit 516 upconverts the X-Band modulated signal to a Ka-Band modulated signal comprising the input data. Thus, the input data can be provided via the modulator 510 in X-Band and in Ka-Band via X-Band and Ka-Band outputs (X and Ka).

The main advantage of the present invention as embodied by FIGS. 3, 4 and 5, is saving hardware by minimizing the amount of input data to be fed to a respective modulator, such that interface circuitries and memory can be saved. Further the amount of hardware necessary for the respective transmission channels usually provided separately in each of the X-Band and the Ka-Bands for downlink from satellite-to-earth can be reduced.

The invention is not limited in any way to the embodiments described above. On the contrary, there are many possibilities for modifications thereof, which are apparent to an average skilled person without departing from the underlying idea of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A transmitter for a dual-frequency satellite-to-earth downlink, the transmitter comprising:
    a plurality of modulators, wherein each of the plurality of modulators is configured
        to modulate respective input data onto a respective one of a first plurality of signals in a first frequency band and to modulate the respective one of the first plurality of signals onto a respective one of a second plurality of signals in a second frequency band, or
        to modulate respective input data onto a respective one of a first plurality of signals in a first frequency band and to modulate the respective input data onto a respective one of a second plurality of signals in a second frequency band;
    a first plurality of amplifiers, wherein each of the first plurality of amplifiers is configured to amplify a respective one of the first plurality of signals to at least a first predetermined signal strength;
    a second plurality of amplifiers, wherein each of the second plurality of amplifiers is configured to amplify a respective one of the second plurality of signals to at least a second predetermined signal strength; and
    wherein a number of the plurality of modulators is smaller than a sum of a number of the first plurality of amplifiers and the second plurality of amplifiers.

2. The transmitter according to claim 1, wherein the respective input data is the same or different for each of the plurality of modulators.

3. The transmitter according to claim 1, wherein the first frequency band is an X-Band and the second frequency band is a Ka-Band.

4. The transmitter according to claim 1, wherein each of the plurality of modulators is configured to modulate the respective one of the first plurality of signals onto the respective one of the second plurality of signals by mixing the respective one of the first plurality of signals with a carrier signal having a frequency of a mid-frequency of the second frequency band minus a mid-frequency of a respective one of a plurality of channels in the first frequency band, wherein the respective one of the first plurality of signals is to be transmitted on the respective one of the plurality of channels.

5. The transmitter according to claim 1, wherein the first and second predetermined signal strengths are each at least sufficient for the dual-frequency satellite-to-earth downlink, such that a receiver on earth is enabled to demodulate and extract the respective input data.

6. The transmitter according to claim 1, wherein the first and second frequency bands are to be used for the dual-frequency satellite-to-earth downlink.

7. The transmitter according to claim 1,
    wherein a respective one of a first plurality of transmission channels at least comprises a respective one of the first plurality of amplifiers, and
    wherein a respective one of a second plurality of transmission channels at least comprises a respective one of the second plurality of amplifiers; and
    wherein the transmitter further comprises:
        a control unit configured to selectively activate or deactivate the respective one of the first plurality of transmission channels, and
        the control unit is further configured to selectively activate or deactivate the respective one of the second plurality of transmission channels.

8. The transmitter according to claim 7,
    wherein the control unit is configured to activate the respective one of the first plurality of transmission channels, when the respective one of the first plurality of transmission channels is to be used for the dual-frequency satellite-to-earth downlink, and wherein the control unit is further configured to deactivate the respective one of the first plurality of transmission channels, when the respective one of the first plurality of transmission channels is not to be used for the dual-frequency satellite-to-earth downlink; and
    wherein the control unit is configured to activate the respective one of the second plurality of transmission channels, when the respective one of the second plurality of transmission channels is to be used for the dual-frequency satellite-to-earth downlink, and wherein the control unit is further configured to deactivate the respective one of the second plurality of transmission channels, when the respective one of the second plurality of transmission channels is not to be used for the dual-frequency satellite-to-earth downlink.

9. The transmitter according to claim 7, wherein the transmitter further comprises:
    a first switching and filtering unit configured to provide, in the case of exactly one activated transmission channel of the first plurality of transmission channels, the respective one of the first plurality of signals to a first antenna, and configured to combine, in the case of exactly two activated transmission channels of the first plurality of transmission channels, the respective two of the first plurality of signals to two orthogonally polarized signals and configured to provide the two orthogonally polarized signals to the first antenna; and
    a second switching and filtering unit configured to provide, in the case of exactly one activated transmission channel of the second plurality of transmission channels, the respective one of the second plurality of signals to a second antenna, and configured to combine, in the case of exactly two activated transmission channels of the second plurality of transmission channels, the respective two of the second plurality of signals to a combined signal separated by frequency and configured to provide the combined signal to the second antenna.

10. The transmitter according to claim 9, wherein the first antenna is the second antenna.

11. The transmitter according to claim 9, wherein the transmitter further comprises:
the first antenna being configured to be impedance matched with the first frequency band and configured to transmit orthogonally polarized electromagnetic waves; and
the second antenna being configured to be impedance matched with the second frequency band and configured to transmit electromagnetic waves in one polarization direction.

12. The transmitter according to claim 7,
wherein the control unit is further configured to selectively activate or deactivate the respective one of the first plurality of transmission channels by providing a first control signal to switch off the respective one of the first plurality of amplifiers included in the respective one of the first plurality of transmission channels, and
wherein the control unit is further configured to selectively activate or deactivate the respective one of the second plurality of transmission channels by providing a second control signal to switch off the respective one of the second 1plurality of amplifier included in the respective one of the second plurality of transmission channels.

* * * * *